(12) United States Patent
Boch et al.

(10) Patent No.: US 10,161,540 B2
(45) Date of Patent: Dec. 25, 2018

(54) VALVE ACTUATING DEVICE WITH ANTI-ROTATION AND AXIAL GUIDANCE MEANS

(71) Applicant: Aktiebolaget SKF, Gothenburg (SE)

(72) Inventors: Christian Boch, Chambery (FR); Jerome Dubus, Aix les Bains (FR)

(73) Assignee: AKTIEBOLAGET SKF, Gothenburg (SE)

( * ) Notice: Subject to any disclaimer, the term of this patent is extended or adjusted under 35 U.S.C. 154(b) by 23 days.

(21) Appl. No.: 15/505,733

(22) PCT Filed: Aug. 29, 2014

(86) PCT No.: PCT/EP2014/068400
§ 371 (c)(1),
(2) Date: Feb. 22, 2017

(87) PCT Pub. No.: WO2016/029965
PCT Pub. Date: Mar. 3, 2016

(65) Prior Publication Data
US 2017/0276256 A1    Sep. 28, 2017

(51) Int. Cl.
*F16K 31/50* (2006.01)
*F16K 3/316* (2006.01)

(52) U.S. Cl.
CPC .......... *F16K 31/508* (2013.01); *F16K 3/3165* (2013.01)

(58) Field of Classification Search
CPC ...... F16K 31/508; F16K 3/3165; F16K 31/50; F16K 3/316

USPC .................. 251/326–329, 266–272
See application file for complete search history.

(56) References Cited

U.S. PATENT DOCUMENTS

| | | | | |
|---|---|---|---|---|
| 2,733,041 | A | * | 1/1956 | Crookston ............ F16K 31/143 251/89 |
| 2,738,684 | A | * | 3/1956 | Shafer .................... F16K 31/508 251/267 |
| 2,845,782 | A | | 8/1958 | Glover |
| 3,281,114 | A | * | 10/1966 | Milleville ............... F16K 27/08 220/304 |

(Continued)

FOREIGN PATENT DOCUMENTS

| | | |
|---|---|---|
| DE | 29719644 U1 | 12/1997 |
| DE | 102007043391 A1 | 3/2009 |

(Continued)

*Primary Examiner* — John Bastianelli
(74) *Attorney, Agent, or Firm* — Bryan Peckjian; SKF USA Inc. Patent Dept.

(57) ABSTRACT

A valve actuated device for a valve having a valve body and a valve translating member; a housing; a rotary and non-translating sleeve mounted in the housing and connected to an input rotary means; an axial shaft means positioned coaxially to the sleeve and adapted to be connected to the valve translating member; screw connecting means provided between the axial shaft means and the sleeve for convert applied rotation of the sleeve into axial translation of the axial shaft means; anti-rotation and axial guidance means installed between the housing and the shaft means; the anti-rotation and axial guidance means providing a linear ball bearing including a sleeve mounted to the housing and at least one rolling element recirculation system, the rolling elements thereof engaging axial groove of the shaft means.

11 Claims, 4 Drawing Sheets

(56) References Cited

U.S. PATENT DOCUMENTS

| | | | | |
|---|---|---|---|---|
| 3,765,642 A | * | 10/1973 | Nelson | F16K 3/0254 |
| | | | | 251/327 |
| 4,844,407 A | * | 7/1989 | Baker | F16K 31/143 |
| | | | | 251/63.6 |
| 5,152,500 A | * | 10/1992 | Hoobyar | F16K 41/103 |
| | | | | 137/240 |
| 5,291,919 A | * | 3/1994 | Calzavara | F16K 31/05 |
| | | | | 137/554 |
| 5,706,856 A | * | 1/1998 | Lancaster | F16K 47/08 |
| | | | | 137/556.3 |
| 6,802,488 B1 | * | 10/2004 | Patterson | F16K 1/123 |
| | | | | 251/129.11 |
| 6,918,574 B2 | * | 7/2005 | Hallden | F16K 3/0254 |
| | | | | 251/267 |
| 7,007,922 B2 | * | 3/2006 | Biester | F16K 31/041 |
| | | | | 251/129.11 |

FOREIGN PATENT DOCUMENTS

| | | | |
|---|---|---|---|
| WO | 2012144371 | A1 | 10/2012 |
| WO | 2013050267 | A1 | 4/2013 |

* cited by examiner

VALVE ACTUATING DEVICE WITH ANTI-ROTATION AND AXIAL GUIDANCE MEANS

CROSS REFERENCE TO RELATED APPLICATIONS

This is a United States National Stage Application claiming the benefit of International Application Number PCT/EP2014/068400 filed on Aug. 29, 2014 which is incorporated herein by reference in its entirety.

FIELD OF THE INVENTION

The present invention concerns actuating devices able to transform a rotation motion into a translation motion, in particular for use in gate valves, control or regulation valves or choke valves.

BACKGROUND OF THE INVENTION

Valves are used in a variety of industries to control the flow of fluids, in particular in the oil and gas industry. Most valves provide a valve body having a longitudinal flow bore and a transverse gate cavity that intersects the flow bore. Actuating devices are used particularly for moving a translating closing plate in the gate cavity between a closed position, in which the plate obstructed the flow bore, and an open position, in which the plate does not obstruct the flow bore. Actuating devices are driven by an input torque, the necessary torques being generally produced with hand-wheels or with electromechanical systems.

Actuating devices further provide transmission mechanism able to transform a rotation motion into a translation motion, being provided with a translating shaft that drives the opening and closing of the gate plate and a rotating sleeve connected to the torque wheel. As an alternative, the shaft may rotate and the sleeve may translate.

Generally, the translating shaft is solidary with the translating closing plate and the anti-rotation torque of the translating shaft is supported by the seat of the gate cavity on which the translating closing plate is bearing. This induces a complementary resistance for the translating motion of the translating closing plate, which increases the input torque.

The references DE 10 2007 043 391, WO 2013/050267 and WO 2012/144371 describe actuating devices in which the anti-rotation torque is supported by rollers having radial axis, disposed in longitudinal groove of a casing. Such dispositions are complicated to implement and induce noises.

BRIEF SUMMARY OF THE INVENTION

According to one embodiment, it is proposed an actuating device comprising a housing adapted to be attached to the valve bonnet; a rotary and non-translating element mounted in the housing and connected to an input rotary means; a non-rotating and translating element positioned coaxially to the rotary and non-translating element and adapted to be connected to the valve translating member; and screw connecting means provided between the non-rotating and translating element and the rotary and non-translating element for converting applied rotation of the input rotary means into axial translation of the non-rotating and translating element for translating the valve translating member.

The actuating device provides further anti-rotation and axial guidance means installed between the housing and the non-rotating and translating element and suitable to oppose rotation of and to guide axially the non-rotating and translating element; the anti-rotation and axial guidance means comprising a linear ball bearing including a sleeve mounted to the housing and at least one rolling element recirculation system having the rolling elements thereof engaging axial groove of the non-rotating and translating element.

The linear ball bearing can include a sleeve and two rolling element recirculation systems, the rolling elements thereof engaging axial grooves of the shaft means, these grooves being diametrically opposed.

The sleeve of the linear ball bearing can be connected to the housing by means of blocking means so as to prevent relative translation and rotation between the sleeve and housing.

The blocking means between the sleeve and the housing can consist of a key engaged in an external groove on a cylindrical outer surface of the sleeve and in an internal groove of the housing.

The non-rotating and translating element can consists of an axial shaft means and the rotary and non-translating element consists in a sleeve mounted coaxially about the axial shaft means.

The axial shaft means can provide a first axial shaft portion, a second axial shaft portion suitable to be connected to the valve translating member and attaching means for attaching these first and second axial shaft portions; the screw connecting means being provided between the first axial shaft portion and the sleeve and the anti-rotation and axial guidance means being installed between the second axial shaft portion and the housing.

The anti-rotation and axial guidance means can be installed between the tubular housing and the second axial shaft portion.

The screw connecting means can provide an inverted roller screw mechanism.

The input rotary means can provide a hand-wheel or an electric or pneumatic or hydraulic actuator.

It is also proposed an assembly comprising a valve including a sliding gate plate and a sliding axial shaft attached to the sliding plate, including further the actuating device and wherein the non-rotating and translating element of the actuating device being connected to the sliding axial shaft of the valve.

BRIEF DESCRIPTION OF THE SEVERAL VIEWS OF THE DRAWING

An actuating device according to the present invention, for a valve, will now be described as an example and illustrated on the drawing in which.

DETAILED DESCRIPTION OF THE INVENTION

Figure 1:
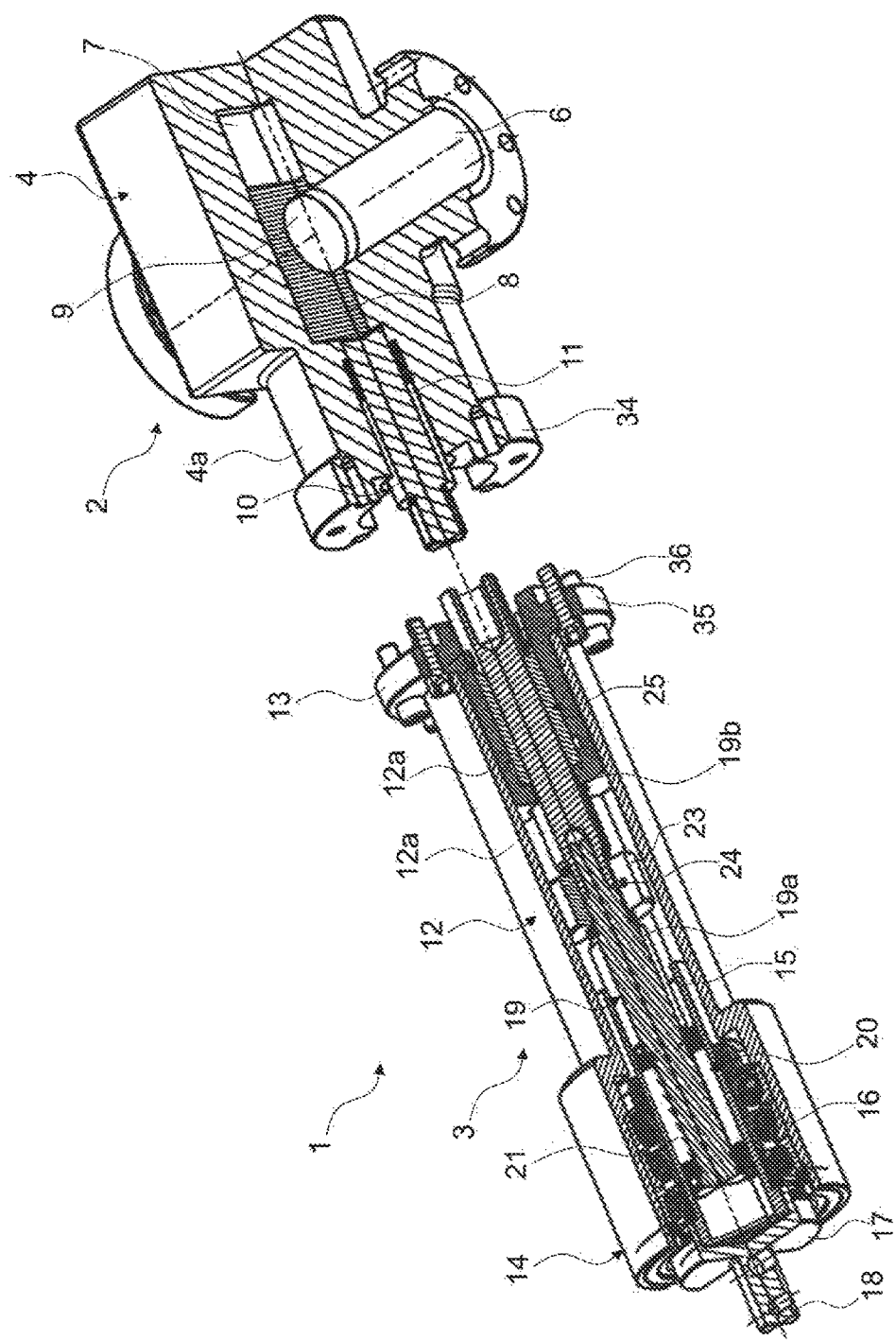
FIG. 1 shows a sectional view, in perspective, of a non-mounted assembly including an actuating device and a valve.
Figure 2:
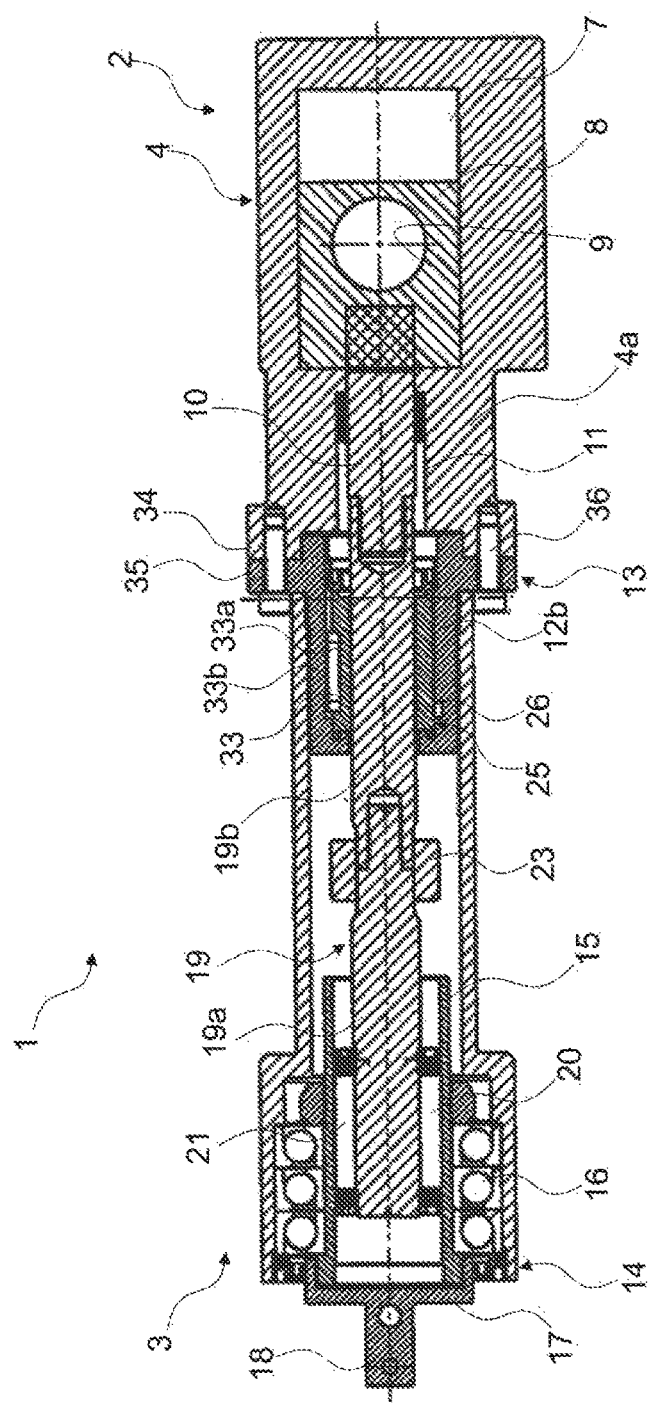
FIG. 2 shows an axial sectional view of the assembly, in a mounted position.

As illustrated on FIGS. 1 and 2, a valve assembly 1 provides a valve 2 and an actuating device 3 for actuating a movable member of the valve 2.

For example, this valve 2 provides a valve body 4 having a transverse flow bore 6 and a transversal gate cavity 7 extending perpendicularly to the flow bore 6 and in which a closing gate plate 8 is bearing.

The closing plate 8 is sliding in the cavity 7 between a closed position, in which the plate 8 obstructs the flow bore 6, and an open position, in which the plate 8 does not obstruct the flow bore 6. For this effect, the closing plate can have a transverse passage 9.

The closing plate 8 is attached to a sliding shaft 10 which extends in a passage 11 of the body 4, formed transversally to the flow bore 4, through a tubular body portion 4a of the body 4, such that the sliding shaft 10 is sliding together with the closing plate 8 between the above-mentioned closed and open positions. The motion of the sliding shaft defines an axial direction used hereafter.

The actuating device 3 provides an elongated tubular housing 12 having a first end 13 suitable to be mounted axially on the body portion 4a, or bonnet, and a second end 14 opposite to the first end 13.

The actuating device 3 provides a non-translating and rotary axial tubular sleeve 15 mounted in the tubular housing 12 by means of a ball bearing 16. The tubular sleeve 15 extends axially along a portion of the tubular housing 12, on the side of the second end 14.

The end of the sleeve 15, close to the end 14 of the tubular housing 12, carries a radial plate 17 provided with an axial axle portion 18 extending outside the tubular housing 12. The axle portion 18 is able to be connected to an input rotary means such as a hand-wheel (not shown).

The actuating device 3 provides a non-rotating and translating axial shaft 19 and screw connecting means 20 provided between the axial shaft 19 and the tubular sleeve 15 for converting applied rotation of the tubular sleeve 15 into axial translation of the axial shaft 19.

The axial shaft 19 provides a first axial shaft portion 19a which extends partially in the tubular sleeve 15.

Figure 4:
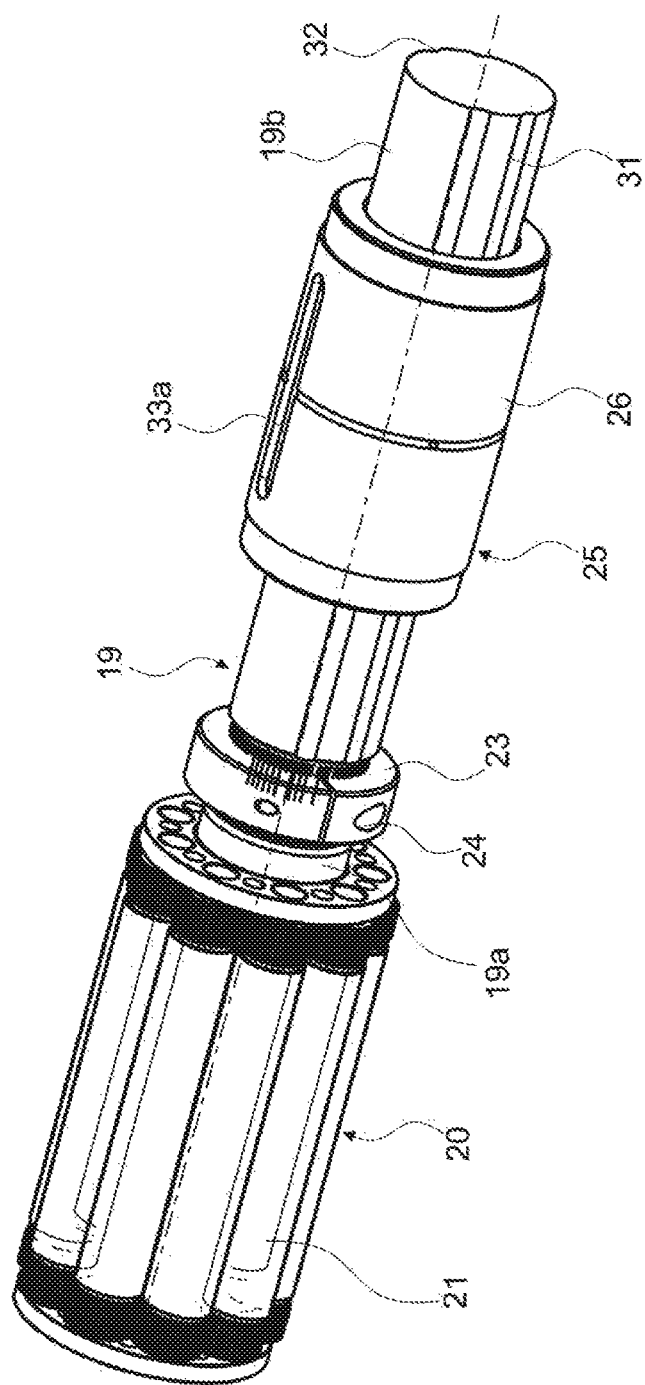
FIG. 4 shows a perspective view of a sub-assembly of the actuating device.

As illustrated particularly in FIGS. 2 and 4, the screw connecting means 20 provides an inverted roller screw mechanism which provides a plurality of longitudinal circulating rollers 21 having respectively a peripheral thread engaged with an inner thread of the tubular sleeve 15 and with a peripheral thread of the shaft portion 20, such that a rotation of the tubular sleeve 15 induces a axial translation of the axial shaft 19 without an axial motion of the rollers 21 with respect to the axial shaft portion 19a.

The axial shaft 19 provides a second axial shaft portion 19b having one end connected to the corresponding end of the first shaft portion 19a and another end suitable to be connected to the end of the sliding shaft 10 of the valve 2.

For example, the connected ends of the shaft portions 19a and 19b penetrate one into the other by screwing and a ring 23 grips the adjacent portions of the shaft portions 19a and 19b. The ring 23 provides two diametrically opposed parts attached with pins 24. Such connection of the two shaft portions permits to attach them one to the other so as to transmit the axial movement and to prevent any relative rotation between them. As an alternative not shown, the two shaft portions may be formed integral so as to define one unique shaft.

The actuating device 3 provides further an anti-rotation and axial guidance means 25 installed between the tubular housing 12 and the shaft portion 19b and suitable to oppose rotation of and to guide axially the axial shaft 19.

Figure 3:
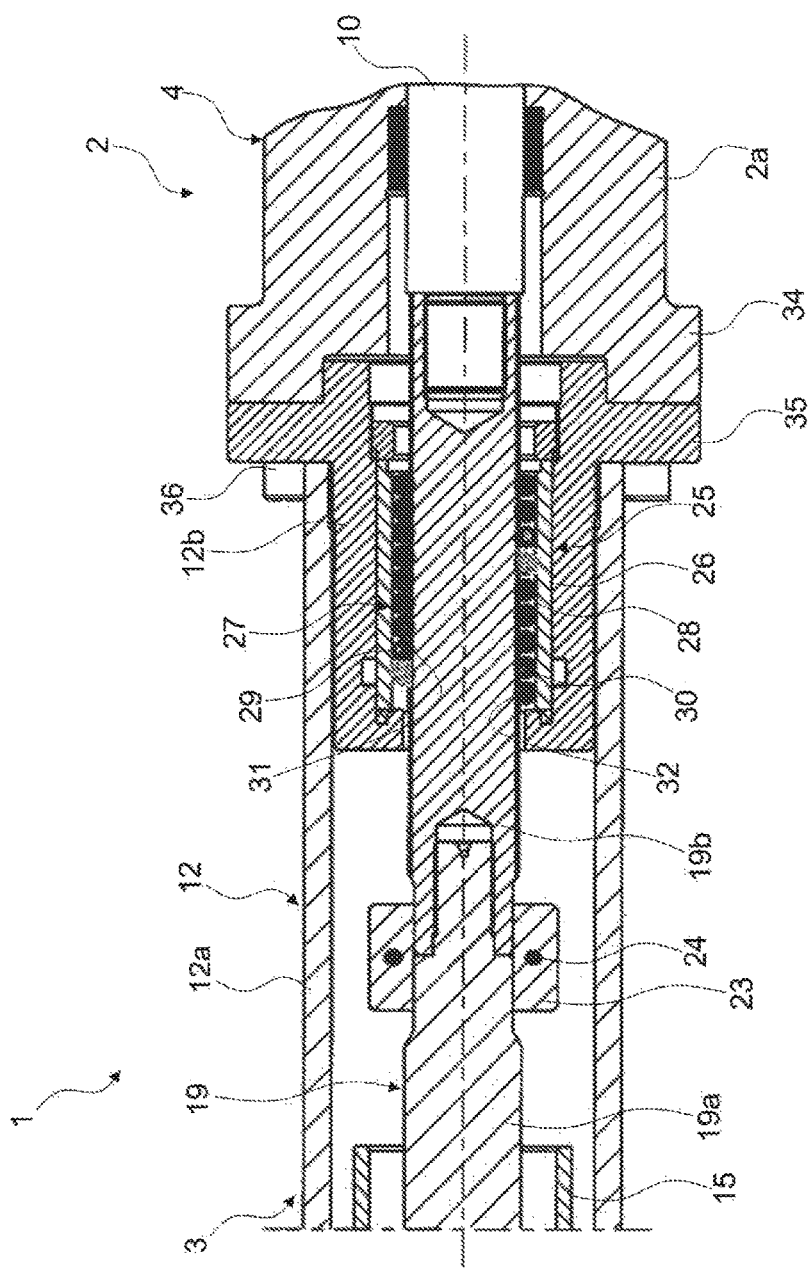
FIG. 3 shows an enlarged partial axial sectional view of the assembly.

As illustrated particularly on FIG. 3, the anti-rotation and axial guidance means 25 consists of a linear ball bearing having a sleeve 26 connected to the housing 12 and including two rolling ball recirculation systems 27 and 28 which are diametrically opposed and which include, in axial channel ways and connecting passages, pluralities of recirculating rolling balls 29 and 30 which engage axial and diametrically opposed grooves 31 and 32 of the shaft portion 19b (FIGS. 3 and 4).

The tubular housing 12 provides an elongated portion 12a in which the ball bearing 16 is installed and an elongated housing sleeve 12b partially engaged in this longitudinal elongated portion 12a at the end 13 of the housing 12 and in which the sleeve 26 of the linear ball bearing 25 is installed. The housing sleeve 12b is mounted in the longitudinal elongated portion 12a by screwing or by any other appropriate fixing means such as gluing, welding, press fitting, etc.

As illustrated on FIGS. 2 and 4, the sleeve 26 of the linear ball bearing 25 is mounted in the housing sleeve 12b and is stopped in rotation by blocking means 33. In the illustrated example, the blocking means consist in a key 33 extending in an external groove 33a on the cylindrical outer surface of the sleeve 26 and engaged in an internal groove 33b of the housing sleeve 12b. A relative translation and rotation between the sleeve 26 and the housing 12 (via the housing sleeve 12b) are then prevented.

As an alternative not shown, the sleeve 26 is directly installed into the sleeve 12, the sleeve comprising an internal groove cooperating with the key 33.

The body portion 2a of the valve 2 and the housing sleeve 12b of the actuating device 3 provide peripheral collar 34 and 35 suitable to be in axial contact and to be assembled by means of axial screws 36 or by any other appropriate fixing means.

The corresponding end portions of the sliding axial shaft 10 of the valve 2 and translating axial shaft 19 are suitable to penetrate one into the other by screwing or by any other appropriate fixing means.

When the actuated device 3 is mounted on the valve 2 as previously described, the sliding axial shaft 10 of the valve 2 and the translating axial shaft 19 of the actuated device 3 constitute a means for translating the gate plate 8 of the valve 2 between the closed and open positions, under the effect of rotations of the tubular sleeve 15 of the actuated device 3, induced by the input rotary means attached to the axle portion 18.

The anti-rotation effect, necessary to the operation of the screw connecting means 20, is produced by the anti-rotation and axial guidance means 25 provided in the actuated device 3, without rotating solicitation of the gate plate 8 of the valve 2.

It results from the above description that the actuated device 3 constitutes a compact unit, inducing an axial guidance of the translating axial shaft 19 thereof and a direct anti-rotation effect on the translating axial shaft 19 thereof, by means of the anti-rotation and axial guidance means 25 consisting of a linear ball bearing, as close to the shaft portion 19b. Although the present invention has been illustrated using a non-rotating and translating axial shaft 19 and a non-translating and rotating sleeve 15, it will be understood that the invention can be applied without major modification to valve actuated device using a non-rotating and translating sleeve and a non-translating and rotating axial shaft. The anti-rotation and axial guidance means 25 consisting in a linear ball bearing is then installed between the non-rotating and translating sleeve and the housing 12 (or via the housing sleeve 12b).

Although the present invention has been illustrated using an inverted roller screw mechanism as transmission mechanism, it will be understood that the invention can be applied without major modification to valve operator assembly using any other type of transmission mechanism, such as re-circulating roller screw mechanism, ball screw mechanism, friction screw mechanism.

Moreover, although the present invention has been illustrated using a plurality of single-row ball bearings, it will be understood that the invention can be applied without major modification to bearings using rolling elements that are not balls and/or that have several rows of rolling elements.

The embodiments disclosed in the description may be arranged or combined together and are still within the meaning of the present invention.

The invention claimed is:

1. A valve actuated device for a valve having a valve bonnet and a valve translating member, comprising:
    a housing adapted to be attached to the valve bonnet;
    a rotary and non-translating element mounted in the housing and connected to an input rotary means;
    a non-rotating and translating element positioned coaxially to the rotary and non-translating element and adapted to be connected to the valve translating member;
    screw connecting means provided between the non-rotating and translating element and the rotary and non-translating element for converting applied rotation of the input rotary means into axial translation of the non-rotating and translating element for translating the valve translating member;
    anti-rotation and axial guidance means installed between the housing and the non-rotating and translating element and suitable to oppose rotation of and to guide axially the non-rotating and translating element;
    the anti-rotation and axial guidance means providing a linear ball bearing including a sleeve mounted to the housing and at least one rolling element recirculation system having rolling elements thereof engaging an non-axial groove of the non-rotating and translating element.

2. The device according to claim 1, wherein the non-rotating and translating element consists of an axial shaft means,
    wherein the linear ball bearing includes a sleeve, two rolling element recirculation systems, the rolling elements thereof engaging axial grooves of the axial shaft means, wherein the grooves are diametrically opposed.

3. The device according to claim 1, wherein the sleeve of the linear ball bearing is connected to the housing by means of blocking means so as to prevent relative translation and rotation between the sleeve and housing.

4. The device according to claim 3, wherein the blocking means between the sleeve and the housing, the blocking means consisting of a key engaged in an external groove on a cylindrical outer surface of the sleeve and in an internal groove of the housing.

5. The device according to claim 1, wherein the non-rotating and translating element consists of an axial shaft means and the rotary and non-translating element consists of a sleeve mounted coaxially about the axial shaft means.

6. The according to claim 5, wherein the axial shaft means comprises a first axial shaft portion, a second axial shaft portion suitable to be connected to the valve translating member and attaching means for attaching the first axial shaft portion and second axial shaft portions;
    the screw connecting means being provided between the first axial shaft portion and the sleeve and the anti-rotation and axial guidance means being installed between the second axial shaft portion and the housing.

7. The device according to claim 6, wherein the anti-rotation and axial guidance means is installed between the tubular housing and the second axial shaft portion.

8. The device according to claim 1, wherein the screw connecting means comprise an inverted roller screw mechanism.

9. The device according to claim 1, wherein the input rotary means comprise a hand-wheel.

10. The device according to claim 1, wherein the input rotary means comprise an electric or pneumatic or hydraulic actuator.

11. An assembly comprising:
    a valve including a sliding gate plate;
    a sliding axial shaft attached to the sliding plate; and
    an actuating device for a valve having a valve bonnet and a valve translating member, a housing adapted to be attached to the valve bonnet; a rotary and non-translating element mounted in the housing and connected to an input rotary means; a non-rotating and translating element positioned coaxially to the rotary and non-translating element and adapted to be connected to the valve translating member; screw connecting means provided between the non-rotating and translating element and the rotary and non-translating element for converting applied rotation of the input rotary means into axial translation of the non-rotating and translating element for translating the valve translating member; anti-rotation and axial guidance means installed between the housing and the non-rotating and translating element and suitable to oppose rotation of and to guide axially the non-rotating and translating element; the anti-rotation and axial guidance means providing a linear ball bearing including a sleeve mounted to the housing and at least one rolling element recirculation system having rolling elements thereof engaging an axial groove of the non-rotating and translating element,
    wherein the non-rotating and translating element of the actuating device is connected to the sliding axial shaft of the valve.

* * * * *